United States Patent [19]

Roush

[11] Patent Number: 4,746,095
[45] Date of Patent: May 24, 1988

[54] BONNET LOCK

[75] Inventor: Walter T. Roush, Houston, Tex.

[73] Assignee: Anderson, Greenwood & Co., Bellaire, Tex.

[21] Appl. No.: 96,729

[22] Filed: Sep. 14, 1987

[51] Int. Cl.⁴ ............................................. F16K 31/44
[52] U.S. Cl. .................................. 251/367; 251/223; 137/315
[58] Field of Search ...................... 251/223, 366, 367; 137/315, 15

[56] References Cited

U.S. PATENT DOCUMENTS

| | | | |
|---|---|---|---|
| 2,958,504 | 11/1960 | Lindgren | 251/223 |
| 3,049,332 | 8/1962 | Webster | 137/315 |
| 3,153,421 | 10/1964 | Webster | 137/315 |
| 3,204,925 | 9/1965 | Montuori | 251/274 |
| 4,118,007 | 10/1978 | Scapes | 251/223 |
| 4,452,428 | 6/1984 | Scaramucci | 251/367 |
| 4,519,580 | 5/1985 | Leighton et al. | 251/223 |
| 4,620,427 | 11/1986 | Kopesky | 251/65 |
| 4,623,120 | 11/1986 | Leighton et al. | 251/223 |
| 4,630,629 | 12/1986 | Nimberger | 251/223 |

*Primary Examiner*—A. Michael Chambers
*Attorney, Agent, or Firm*—Gun, Lee & Jackson

[57] ABSTRACT

In a valve having a valve body and a bonnet mounted on the valve body, a bonnet lock secures the bonnet against relative rotation with the valve body. The bonnet lock cooperates with a pin driven into the valve body to lock the bonnet against rotation. Unequally spaced slots formed about the lower end of the bonnet lock permit adjustment of the bonnet lock for alignment with the lock pin. A jam nut threadably mounted on the bonnet engages the bonnet lock and maintains it in position.

18 Claims, 2 Drawing Sheets

BONNET LOCK

BACKGROUND OF THE INVENTION

This invention relates to a valve bonnet structure. Particularly, to a bonnet lock assembly installed about the valve bonnet for locking the valve bonnet to the valve body.

Valve bonnets are well known in the prior art. Typically, a valve bonnet is threadably mounted to a valve body. The bonnet carries a valve stem having a valve member at its distal end for engagement with a valve seat formed in the valve body. The bonnet is threaded to the valve body primarily to establish a seal between the bonnet and the valve body. The bonnet also aids in properly positioning the valve stem relative to the valve seat. Therefore, once threaded to the proper torque, further rotation of the bonnet relative to the valve body is undesirable. Consequently, various locking arrangements about the bonnet have been attempted in the prior art. A typical arrangement involves the placement of a roll pin installed in the valve body adjacent to the bonnet to prevent accidental removal of the bonnet. In such an arrangement, the roll pin allows some rotation of the bonnet. In addition, relatively low torque may bend the roll pin, thereby reducing its effectiveness in preventing accidental removal of the valve bonnet.

Attempts have been made to overcome the disadvantages associated with the typical roll pin retaining arrangement. In U.S. Pat. No. 4,118,007, a valve structure is disclosed which includes a radially enlarged recess for receiving a bonnet. A retainer pin is received in a hole provided in the body of the valve radially outwardly of the recess. A semicircular notch formed in the valve body extends about the pin hole and provides a support shoulder for the pin to aid in preventing outward deformation of the pin upon rotation of the bonnet.

U.S. Pat. No. 3,049,332 and related U.S. Pat No. 3,153,421, show a locking member comprising a retainer element which slips over the valve bonnet to secure it from rotation. The retainer element is secured against rotation by a lock screw threaded into the valve body.

The invention of the present disclosure provides an improved bonnet lock assembly to overcome the disadvantages associated with retainer elements presently available to prevent undesirable rotation of a valve bonnet.

SUMMARY OF THE INVENTION

The present invention comprises a bonnet lock which mounts about the valve bonnet which typically has a hexagonal shape. The bonnet lock is profiled to mate with the shape of the valve bonnet so that any rotational force applied to the valve bonnet is transferred to the bonnet lock. The bonnet lock of the invention includes notches or slots formed in the bottom portion thereof. The slots are unequally spaced on the hexagonal surfaces of the bonnet lock and receive a pin driven into the valve body. A portion of the pin extends above the valve body and the bonnet lock of the invention may be aligned to receive the pin in one of the slots of the bonnet lock. A jam nut is threaded onto the valve stem to hold the bonnet lock in position about the valve bonnet. The completed bonnet lock assembly places the pin in shear to retain the valve bonnet against rotation, thus eliminating the outward bending stress on the pin associated with other available bonnet locks.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION OF THE INVENTION

Figure 1:
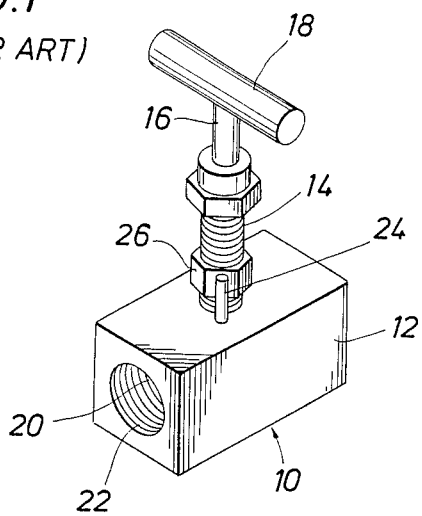
FIG. 1 is a perspective view of a bonnet lock arrangement typical of the prior art.

Referring first to FIG. 1, a prior art valve structure, generally designated by the reference numeral 10, is shown. The valve 10 comprises a valve body 12 having a valve bonnet 14 threadably connected to the valve body 12. The valve bonnet 14 carries a stem 16 which may be threadably advanced or retracted through the valve bonnet 14 upon manipulation of the handle 18. The stem 16 is provided at its inner end with a valve element for selective engagement with a valve seat formed in the valve body 12.

The valve body 12 defines a valve chamber 20 having an inlet port 22 which opens into the valve chamber 20. An outlet port also opening into the valve chamber 20 is located on the opposite end of the valve body 12. The valve seat (not shown in the drawing) is located between the inlet and outlet ports and cooperates with the valve element located on the inner end of the stem 16 to selectively control fluid flow through the valve body 12.

Typical operation of the valve 10 is accomplished by manipulating the handle 18 to advance the valve element toward and engagement with the valve seat to close the fluid passage through the valve body 12 defined between the inlet and outlet ports. The valve 10 is opened by retracting the valve element from the valve seat partially or fully to a position permitting fluid flow through the valve body 12. The stem 16 and valve bonnet 14 cooperate in a well-known manner to permit the valve element to be engaged with or disengaged from the valve seat. The valve bonnet 14 is provided with internal threads which cooperate with a threaded portion on the stem 16 to adjust the valve element to permit the required fluid flow through the valve body 12.

As mentioned briefly above, a problem associated with the bonnet-type valves is maintaining the bonnet in proper mounted relationship with the valve body 12. In FIG. 1, a conventional method for maintaining the bonnet 14 against rotation relative to the valve body 12 includes the installation of a pin 24 in the body 12 to prevent rotation of the bonnet 14. The pin 24 is driven into a hole formed in the body 12 after the bonnet 14 has been installed on the valve body 12. The bonnet 14 includes a plurality of flat surfaces 26, typically arranged in a hexagonal array. Other shapes, such as squares and octagons, have also been utilized. The flat surfaces 26 provide an engagement surface for a wrench or the like for installing the bonnet 14 on the valve body 12. The locking pin 24 is driven into a hole formed in the valve body so that the pin 24 is located adjacent to one of the flat surfaces 26 to lock the bonnet 14 against further rotation after installation.

To this juncture, the bonnet-type valve structure described is typical of valve structures available in the art. However, a disadvantage associated with the valve structure of FIG. 1 is that the pin 24 does not provide a positive lock against rotation of the bonnet 14. Therefore, relatively low torque may deform the pin 24 outwardly away from the bonnet surface 26 upon forcible rotation of the bonnet 14.

Figure 2:
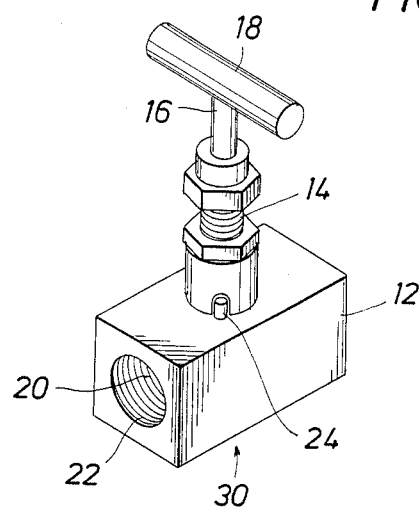
FIG. 2 is a perspective view of the bonnet lock assembly of the present disclosure.
Figure 3:
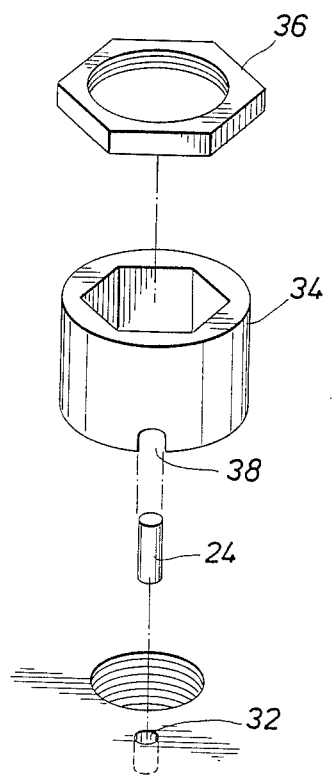
FIG. 3 is an exploded view showing the relationship of the elements of the bonnet lock assembly of the present invention.

Referring now to FIG. 2, the valve structure of the present invention, generally designated by the numeral 30, is shown. The valve 30 includes an improved valve structure for preventing the undesirable rotation of the bonnet 14 once it is properly mounted to the valve body 12. For the sake of convenience, the valve components of the valve 30 which are identical to components of valve 10 shown in FIG. 1 have been identified with like reference numerals in FIG. 2.

The bonnet locking arrangement of the present invention includes the pin 24 which is received within a hole 32 formed in the valve body 12, a bonnet lock 34 and a jam nut 36. The pin 24 is securely retained within the hole 32 and includes a portion which projects from the valve body 12 opposite a flat 26 of the valve bonnet 14, as previously mentioned. The bonnet lock 34 is provided with one or more slots 38 about the lower end thereof which are sized to receive the portion of the pin 24 which projects from the valve body 12. The slots 38 are sized for close tolerance fit about the pin 24 to maximize the positive locking feature provided by the bonnet lock of the present invention.

Figure 4:
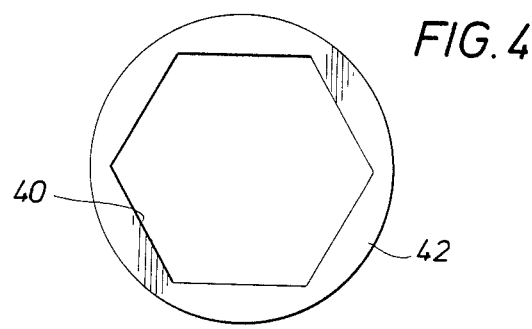
FIG. 4 is a top view of the bonnet lock of the invention taken along line 4—4 of FIG. 5.
Figure 5:
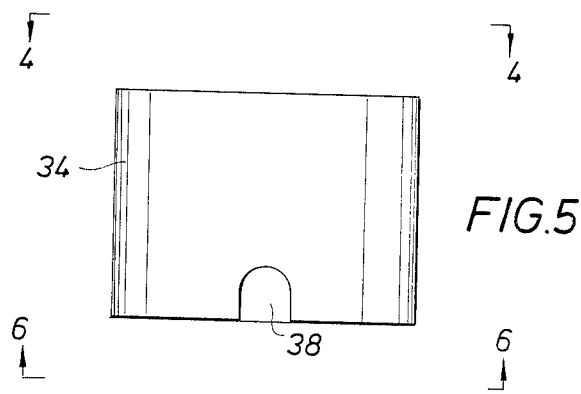
FIG. 5 is a side view of the bonnet lock of the invention.
Figure 6:
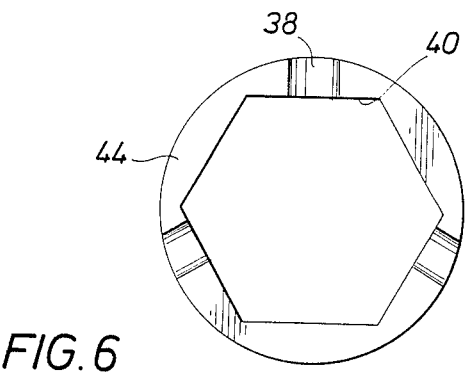
FIG. 6 is a bottom view of the bonnet lock of the invention taken along line 6—6 of FIG. 5.

Referring now to FIGS. 4-6, collectively, the bonnet lock 34 of the invention is shown in greater detail. The bonnet lock 34 comprises a substantially cylindrical body having an axial passage extending therethrough. The axial passage is defined by internal flatted surfaces 40. In the embodiment of FIGS. 4-6, the surfaces 40 define a hexagonal shape to match the hexagonal shape of the bonnet 14. It is understood, however, that the bonnet lock 34 may be provided with a plurality of flat surfaces 40 to match the shape of the bonnet 14. Alternatively, the bonnet lock 34 may be provided with a single flat surface 40, if desired. The height of the bonnet lock 34 is defined between an upper end 42 and a lower end 44. The ends 42 and 44 are flat and lie in a plane substantially perpendicular to the longitudinal axis of the bonnet lock 34.

A plurality of slots 38 are formed in the lower end 44 of the bonnet lock 34. The slots 38 are unequally spaced about the end 44. The slots 38 extend through the body of the bonnet lock 34 substantially perpendicular to the flat surfaces 40 as best shown in FIG. 6. In the embodiment of FIG. 6, the bonnet lock 34 includes three slots which are unequally spaced about the end 44 and extend through every other flat surface 40. The three slots are optimally positioned to assure alignment with the pin 24. Additional slots 38 may be added if desired to provide smaller increments of rotation between locking points.

The bonnet lock 34 is easily installed about the bonnet 14 and may also be retrofitted to existing valves. In a typical installation on an existing valve, the bonnet 14 is threaded to the valve body 12 and tightened to the appropriate relationship for the valve element and valve seat. The pin 24 is driven into the hole 32 of the valve body 12 adjacent to a flat 26 of the bonnet 14. The bonnet lock 34 is slid over the bonnet 14 so that one of the slots 38 is aligned with or close to the pin 24. If necessary, a minor adjustment may be required to align the pin 24 with the slot 38. This may be accomplished by tightening the bonnet 14 slightly to permit the bonnet lock 34 to slide over the pin 24. The jam nut 36 is then tightened against the surface 42 of the bonnet lock 34 to hold it in position. In this arrangement, if attempts are made to remove the bonnet 14 without removing the jam nut 36 and bonnet lock 34, a rotational force will be applied to the internal flat surfaces 40, which rotational force will be restrained by the pin 24. A shearing force, rather than bending force, is therefore applied to the pin 24 providing a positive and stronger lock for the bonnet 14.

On a new valve constructed according to the present disclosure, the hole 32 may be formed in the valve body 12 a sufficient distance from the bonnet 14 whereby the bonnet 14 may be threaded to the valve body 12 without contacting the pin 24 projecting from the hole 32. The pin 24 is driven into the hole 32 prior to the installation of the bonnet 14. Installation of the pin 24 prior to the bonnet 14 is more convenient in that the bonnet 14 does not interfere with the pin installation so that it is much easier to drive the pin 24 into the hole 32. After installation of the pin 24, the bonnet 14 is threaded on the valve body 12. The bonnet 14 is tightened until one of the slots 38 aligns with the pin 24 as described above. The body of the bonnet lock 34 is of sufficient thickness or bulk which permits the pin 24 to be spaced a slightly greater distance from the bonnet 14 than on existing valves, yet it provides a positive lock for the bonnet 14 in the manner described above.

Figure 7:
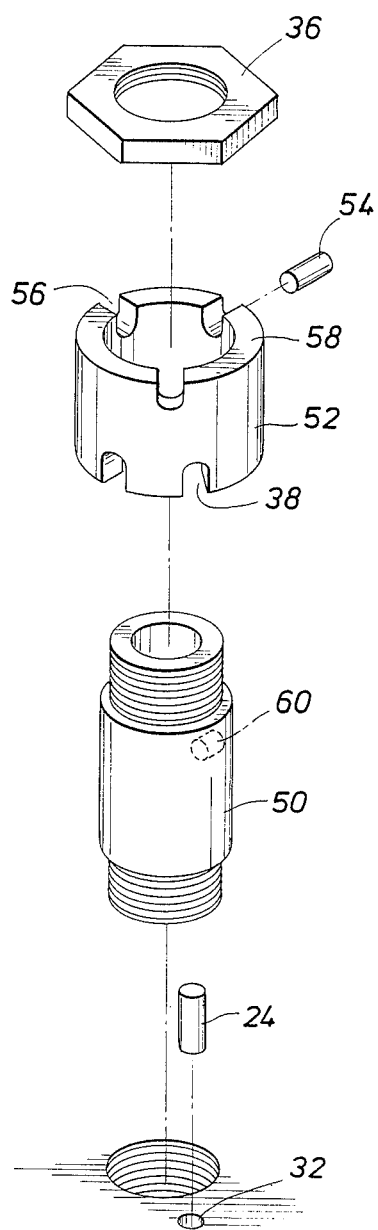
FIG. 7 is an exploded view of an alternate embodiment of the bonnet lock of the invention.
Figure 8:
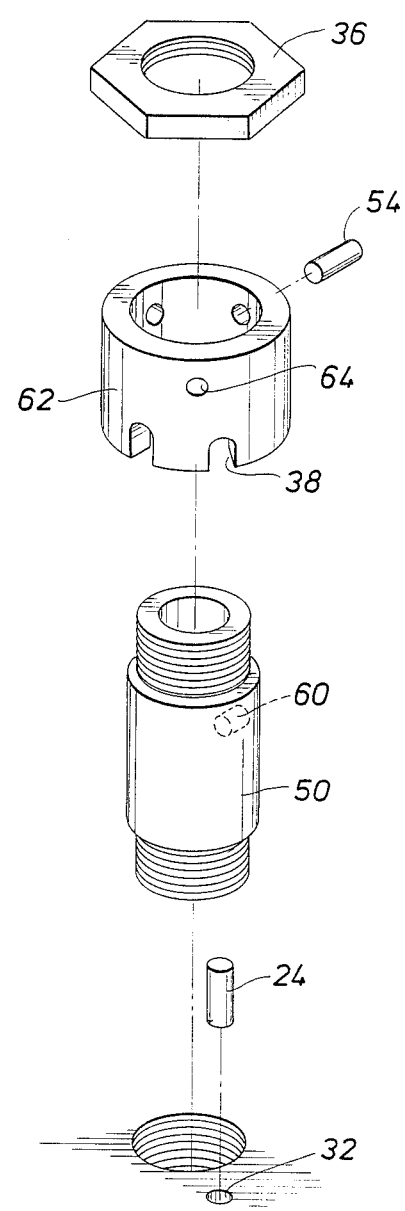
FIG. 8 is an exploded view of another alternate embodiment of the bonnet lock of the invention.

Referring now to FIGS. 7 and 8, alternate embodiments of the bonnet lock of the invention are shown. In the embodiments of FIGS. 7 and 8, the bonnet 50 is substantially cylindrical in shape. To accommodate the shape of the bonnet 50, the bonnet lock 52 shown in FIG. 7 includes a substantially cylindrical axial passage. To prevent relative rotation between the bonnet 50 and bonnet lock 52, one or more lock pins 54 may be used to lock the bonnet 50 and bonnet lock 52 against relative rotation. In the embodiment of FIG. 7, the bonnet lock 52 includes a plurality of notches 56 formed in the upper end 58 of the bonnet lock 52. The bonnet 50 is provided with one or more holes 60 in the body thereof for alignment with the slots 56 to receive the locking pin 54 therein. In FIG. 8, the bonnet lock 62 is provided with a plurality of holes 64 which extend through the body of the bonnet lock 62. The holes 64 must likewise be aligned with the holes 60 in the body of the bonnet 50 for receiving the locking pin 54 therethrough and thereby locking the bonnet 60 and bonnet lock 62 against relative rotation.

Installation of the bonnet lock of the invention shown in FIGS. 7 and 8 is accomplished in substantially the same manner previously described. The bonnet 50 is threadably installed on the valve body and the lock pin 24 is driven into the hole 32. The bonnet locks 52 and 62 are positioned over the bonnet 50 and the slots 38 thereof are aligned with the pin 24. Adjustment of the bonnet 50 may be required to also align the holes 60 with the slots 56 of the bonnet lock 52 or the holes 64 of the bonnet lock 62. The lock pin 54 is then driven through the body of the bonnet locks 52 and 64 into the receiving hole 60 of the bonnet 50. The jam nut 36 is tightened against the bonnet lock 52 and 64 to provide a downward force thereon to hold the bonnet lock in position.

While the foregoing is directed to the preferred embodiments of the present invention, other and further embodiments of the invention may be devised without departing from the basic scope thereof, and the scope thereof is determined by the claims which follow.

What is claimed is:

1. In a valve having a valve body including a fluid inlet port and a fluid outlet port defining a fluid passage through said valve body, a bonnet mounted on said valve body, and a valve stem rotatable within said bonnet and carrying a valve element for selectively controlling fluid flow through the valve, the improvement comprising a bonnet lock means cooperating with said bonnet for preventing relative rotation between said bonnet and said valve body, wherein said bonnet lock means includes a lock pin mounted on said valve body adjacent said bonnet, a bonnet lock mounted about said bonnet and a jam nut threadably mounted on said bonnet and in retaining engagement when with said bonnet lock.

2. The apparatus of claim 1 wherein said bonnet lock comprises a substantially cylindrical body having an axial passage extending therethrough, said passage being defined by a plurality of flat surfaces extending substantially parallel to the rotational axis of said cylindrical body, said flat surfaces being arranged for cooperating engagement with a plurality of flat surfaces on said bonnet.

3. The apparatus of claim 2 wherein said flat surfaces define a hexagonal shape.

4. The apparatus of claim 2 wherein said bonnet lock includes at least one slot formed through the lower end thereof, said slot sized to receive a portion of said lock pin projecting from said valve body.

5. The apparatus of claim 4 including three slots formed about the lower end of said bonnet lock, said three slots being unequally spaced permitting incremental rotation between locking points.

6. The apparatus of claim 5 wherein said slots extend through the body of said bonnet lock substantially perpendicular to said flat surfaces of said bonnet lock.

7. The apparatus of claim 6 wherein said slots extend through alternate flat surfaces of said bonnet lock.

8. The apparatus of claim 2 wherein said bonnet lock includes at least one notch formed through the upper end thereof for alignment with a hole formed in said bonnet for receiving a retainer pin for locking said bonnet lock and said bonnet against relative rotation.

9. The apparatus of claim 2 wherein said bonnet lock includes at least one retainer pin hole formed through the upper end thereof for alignment with a hole formed in said bonnet for receiving a retainer pin for locking said bonnet lock and said bonnet against relative rotation.

10. The apparatus of claim 1 wherein said bonnet lock comprises a substantially cylindrical body having an axial passage extending therethrough, a portion of said passage being defined by at least one flat surface extending substantially parallel to the rotational axis of said cylindrical body, said flat surface cooperating with at least one flat surface formed on said bonnet for locking said bonnet lock and said bonnet against relative rotation.

11. A bonnet lock assembly, comprising:
(a) a bonnet lock having a cylindrical body including an axial passage extending therethrough, said passage being defined by a plurality of flat surfaces extending substantially parallel to the rotational axis of said cylindrical body;
(b) a lock pin cooperating with said bonnet lock to restrain relative rotation of a valve bonnet mounted on a valve body; and
(c) a jam nut threadably mounted on said valve bonnet and in retaining engagement with said bonnet lock.

12. The apparatus of claim 11 wherein said flat surfaces define a hexagonal shape.

13. The apparatus of claim 12 wherein said bonnet lock includes at least one slot formed through the lower end thereof, said slot sized to receive a portion of said lock pin projecting from said valve body.

14. The apparatus of claim 13 including three slots formed about the lower end of said bonnet lock, said three slots being unequally spaced permitting incremental rotation between locking points.

15. The apparatus of claim 14 wherein said slots extend through the body of said bonnet lock substantially perpendicular to said flat surfaces of said bonnet lock.

16. The apparatus of claim 15 wherein said slots extend through alternate flat surfaces of said bonnet lock.

17. The apparatus of claim 11 wherein said bonnet lock includes at least one notch formed through the upper end thereof for alignment with a hole formed in said bonnet for receiving a retainer pin for locking said bonnet lock and said bonnet against relative rotation.

18. The apparatus of claim 11 wherein said bonnet lock includes at least one retainer pin hole formed through the upper end thereof for alignment with a hole formed in said bonnet for receiving a retainer pin for locking said bonnet lock and said bonnet against relative rotation.

* * * * *